United States Patent
Yantz

(10) Patent No.: US 12,375,118 B1
(45) Date of Patent: Jul. 29, 2025

(54) SUN SHADE FOR A DISPLAY SCREEN

(71) Applicant: Doug Yantz, Colchester, VT (US)

(72) Inventor: Doug Yantz, Colchester, VT (US)

( * ) Notice: Subject to any disclaimer, the term of this patent is extended or adjusted under 35 U.S.C. 154(b) by 555 days.

(21) Appl. No.: 17/876,375

(22) Filed: Jul. 28, 2022

Related U.S. Application Data

(60) Provisional application No. 63/226,247, filed on Jul. 28, 2021.

(51) Int. Cl.
| | |
|---|---|
| *H04B 1/3888* | (2015.01) |
| *A45C 11/00* | (2006.01) |
| *G06F 1/16* | (2006.01) |
| *H04M 1/02* | (2006.01) |

(52) U.S. Cl.
CPC .......... *H04B 1/3888* (2013.01); *A45C 11/002* (2025.01); *G06F 1/1629* (2025.01); *H04M 1/0203* (2025.01); *H04M 1/0206* (2013.01)

(58) Field of Classification Search
CPC .......................... H04B 1/3888; H04M 1/0206; H04M 1/0203; A45C 11/002; G06F 1/1629
See application file for complete search history.

(56) References Cited

U.S. PATENT DOCUMENTS

| | | | |
|---|---|---|---|
| 9,806,756 B1 | 10/2017 | Jacobs et al. | |
| 10,021,227 B2 | 7/2018 | Gander et al. | |
| 10,310,559 B2 | 6/2019 | Holmes | |
| 10,728,754 B2* | 7/2020 | Lee | H04W 12/02 |
| 2015/0381785 A1* | 12/2015 | Gander | H04M 1/04 455/575.1 |
| 2019/0072996 A1* | 3/2019 | Pickens | G06F 1/1626 |

* cited by examiner

*Primary Examiner* — Rafael Perez-Gutierrez
*Assistant Examiner* — Gilbert M. Grant
(74) *Attorney, Agent, or Firm* — Downs Rachlin Martin PLLC

(57) ABSTRACT

A case for a smart phone includes a shade portion hingeably attached an edge of the case such that the shade can be rotated from a stowed position in which the shade is flat against the back side of the case to a variety of shading positions in which the shade is angled over the front side of the case to provide shading for a display screen of a smart phone in the case. The shade may be positioned and secured at several different angles and may include a closable window or opening that is aligned with a camera port when the shade is in the stowed position. In this way, a camera of a phone in the case will not be blocked when the shade is in the stowed positioned while the opening can be closed so that the shade will provide full shade when in a shading position.

15 Claims, 9 Drawing Sheets

SUN SHADE FOR A DISPLAY SCREEN

FIELD OF THE INVENTION

The present invention generally relates to the field of mobile phone accessories and more specifically to sun shades for display screens.

BACKGROUND

When a smart phone is used in a bright environment, such as in direct sunlight, it can be difficult to see the contents on a display screen without shading the screen somehow, which is often done with a user's hand. However, it can be difficult to shade the screen with one hand while also operating the phone.

A retractable shade device connected to the smart phone positioned to shield the display from bright light would be desirable. Indeed, several attempts have been made to address this issue. However, those proposed in the prior art have proven to be too bulky and/or cumbersome to use.

SUMMARY OF THE DISCLOSURE

A case for shading a display screen of a phone contained within the case includes a hinge attached to a top side of the case and a shade panel connected to the hinge an having an opening and a cover for the opening. The cover is slidable between an open position in which the opening is open and a closed position in which the opening is covered, wherein the shade panel and operable such that the shade panel is rotatable between a stowed configuration in which the shade panel is facing and in contact with the rear side of the phone and a shading configuration in which the shade panel is positioned at an angle over the display screen A method for shading a display screen of a phone includes securing the phone within a case, the case including a top edge and a shade panel to the top edge via a hinge, rotating the shade panel from a stowed configuration in which the shade panel lies flat against a rear of the case to a shading configuration in which the shade panel is angled over a portion of the display screen, and sliding a cover of a window in the shade panel from an open position in which the window is uncovered to a closed position in which the window is covered when the shade panel is rotated from the stowed configuration to the shading configuration.

A case for a smart phone is provided that includes a front side, wherein the front side is configured to receive and secure the smart phone, a rear side opposite the front side, an edge between the front side and the rear side, and a screen shade having a top side and being hingeably attached to the edge. The screen shade includes an opening and a cover for the opening, wherein the cover is slidable between an open position in which the opening is open and a closed position in which the opening is covered and wherein the screen shade rotates between a stowed configuration in which the top side of screen shade member is facing and in contact with the rear side of the case and a shading configuration in which the screen shade member is positioned at an angle over the front side of the case.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1:
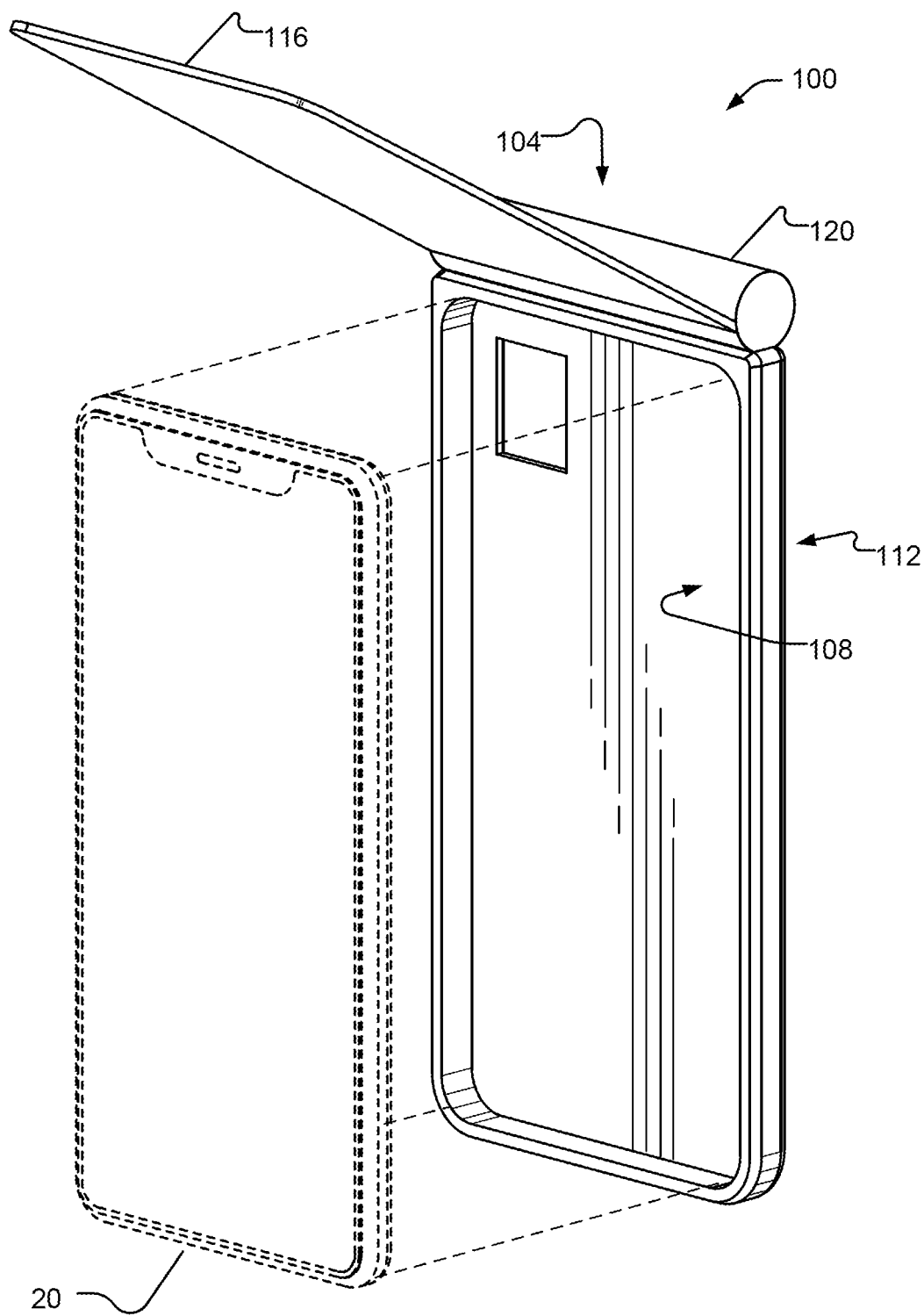
FIG. 1 is a perspective view of a phone case with a sun shade in accordance with an embodiment of the present invention.

A sun shade or visor is provided for a smart phone or other device with a display screen that may be part of or attached to a case for the device or attached to the device and is hingeably attached to one side, such as the upper edge, of the case or device such that the screen shade can be rotated from a stowed position in which the screen shade is flat against the back side of the case or device to a variety of shading positions in which the screen shade is angled over the front side of the device to provide shading for the display screen. The screen shade may be positioned and secured at several different angles and may include one or more closable windows or openings that are positioned such that they are aligned with a camera port or other component of the device that requires access or no obstruction when the screen shade is in the stowed position. In this way, a camera or other component of a phone will not be blocked when the screen shade is in the stowed positioned while the openings can be closed so that the screen shade will provide full shade when in a shading position.

Turning to the figures, a phone case 100 is shown in FIGS. 1-4 and is configured to receive and protect a smart phone 20. Case 100 includes a top edge 104, a front side 108 into which phone 20 is inserted and held, and a back side 112. A screen shade 116 is hingeably attached via hinge 120, such as a plano type hinge, to a side of case 100 (e.g., top side 104 as shown in FIGS. 1-4). In this way, screen shade 116 may be positioned and maintained at any of several angles (example angles are shown in dashed lines in FIG. 3) when in the shading configuration without the user having to hold screen shade 116 in place.

Figure 2:
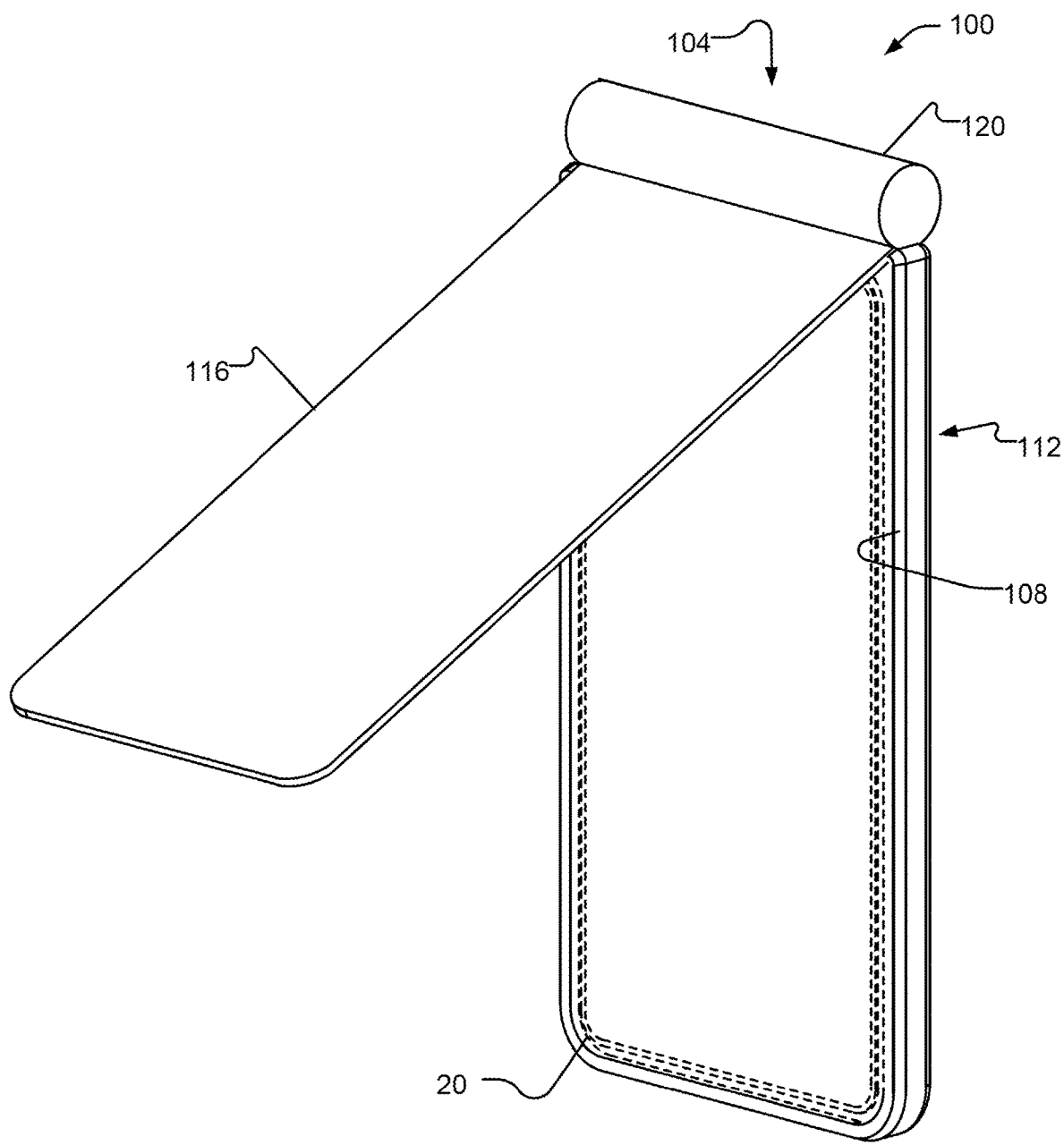
FIG. 2 is a perspective view of the phone case of FIG. 1 with the sun shade in a screen shading position.
Figure 3:
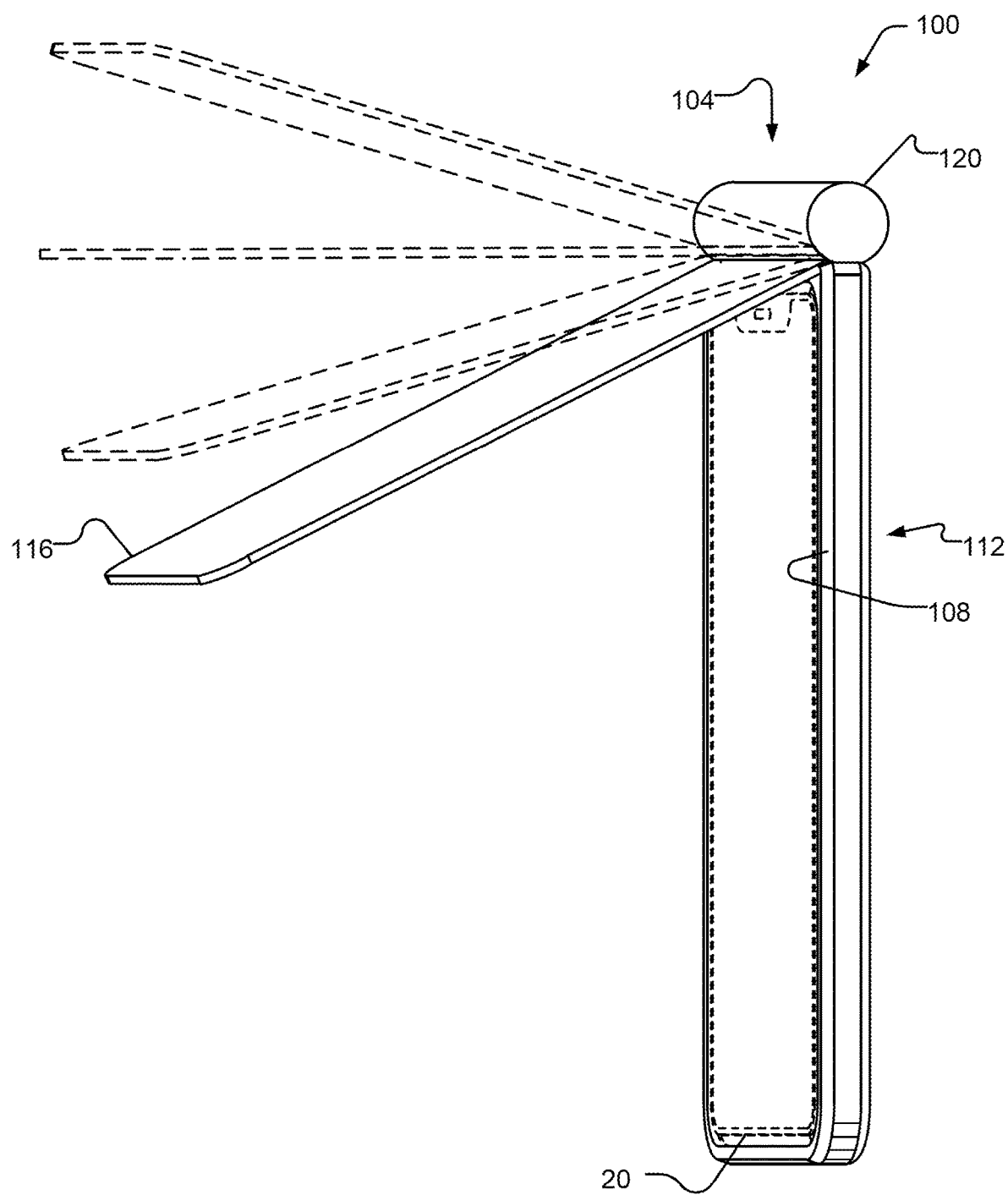
FIG. 3 is a side perspective view of the phone case of FIG. 1 illustrating various screen shading positions of the screen shade.
Figure 4:
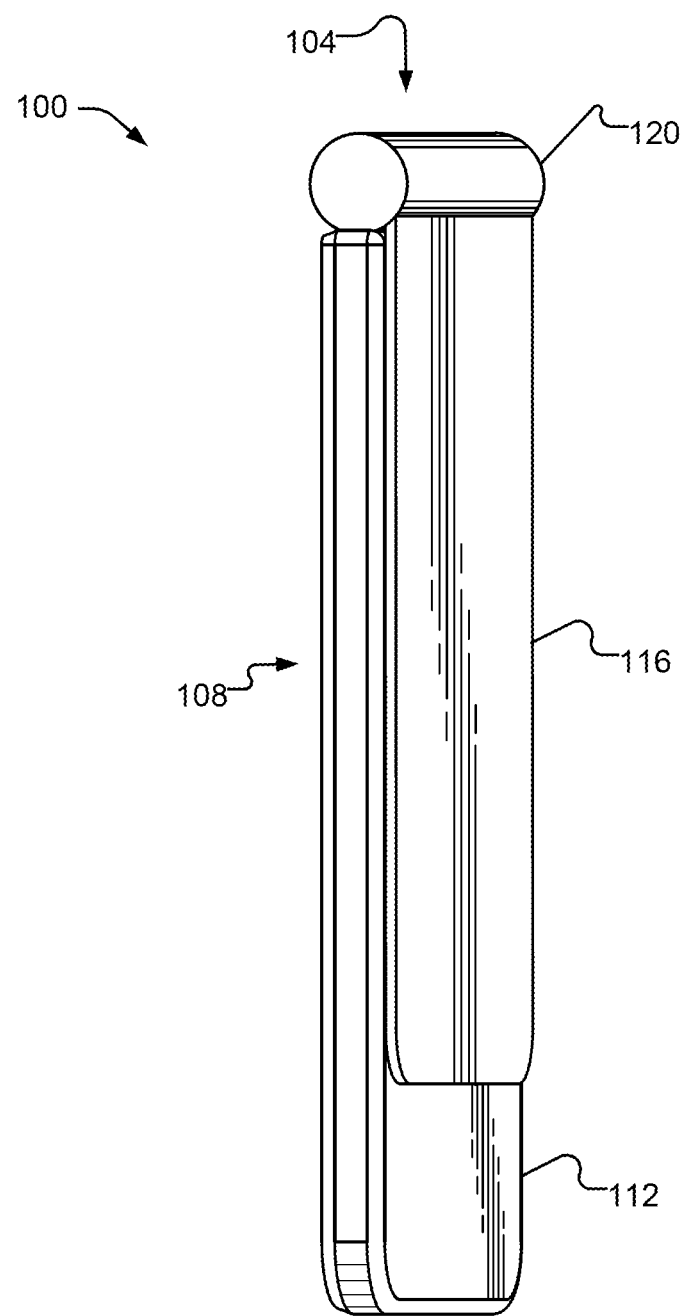
FIG. 4 is a side perspective view of the phone case of FIG. 1 with the screen shade in a stowed position.

Screen shade 116 may be may of any suitable material and preferably is rigid or semi-rigid so that screen shade 116 maintains a relatively straight profile when in a shading position (as shown in FIG. 2). Screen shade 116 may be any suitable length sufficient to provide shade on a display screen of a phone contained in case 100 when in the shading position, up to the full length of case 100. In a preferred embodiment, screen shade 116 is sufficiently thin such that screen shade 116 does not contribute substantially to the overall thickness of the phone and case 100 when screen shade 116 is in the stowed positioned, as shown in FIG. 4.

Figure 5:
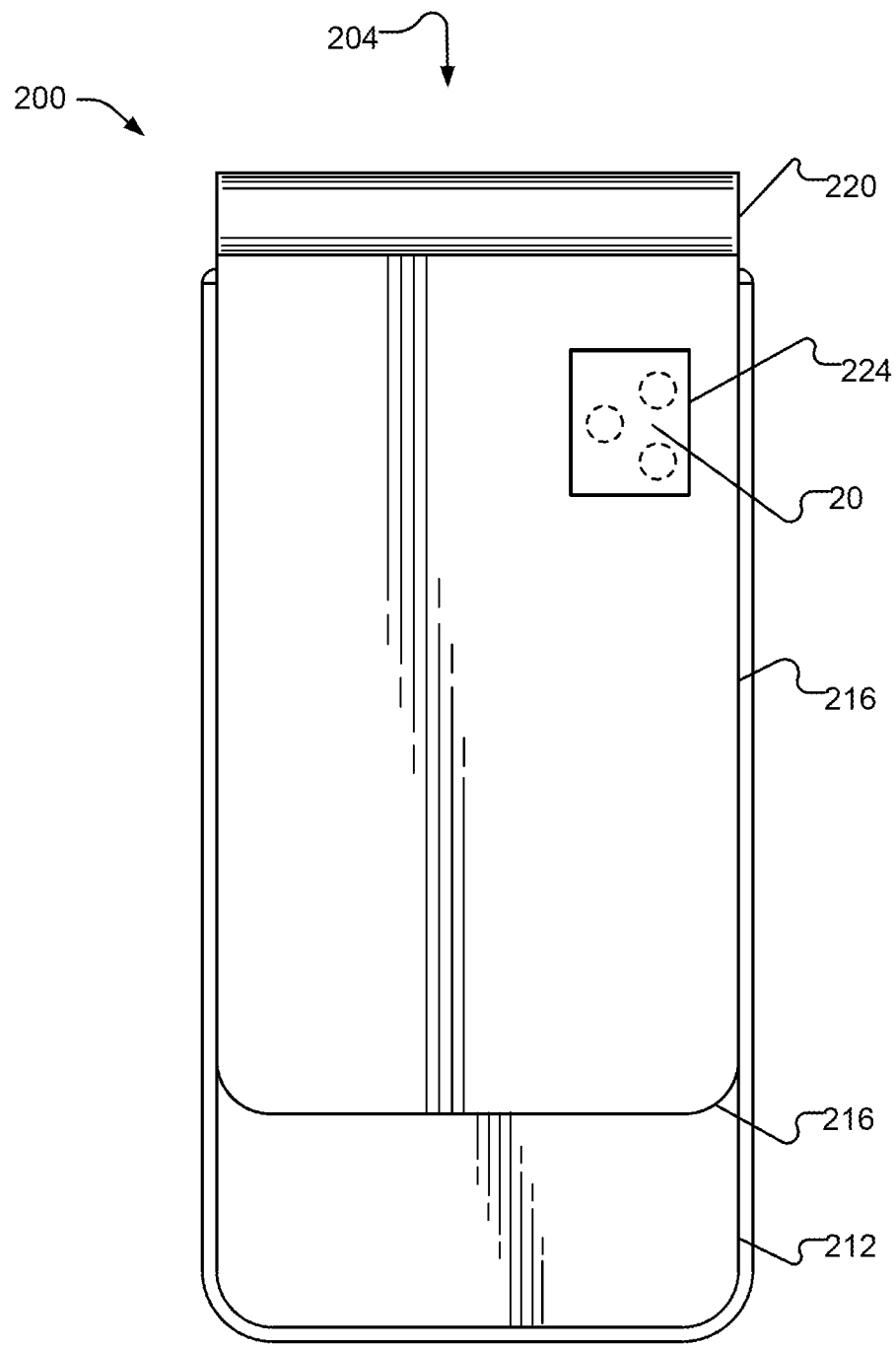
FIG. 5 is a rear view of a phone case with a screen shade in a stowed position with a widow for a phone camera lens.
Figure 6:
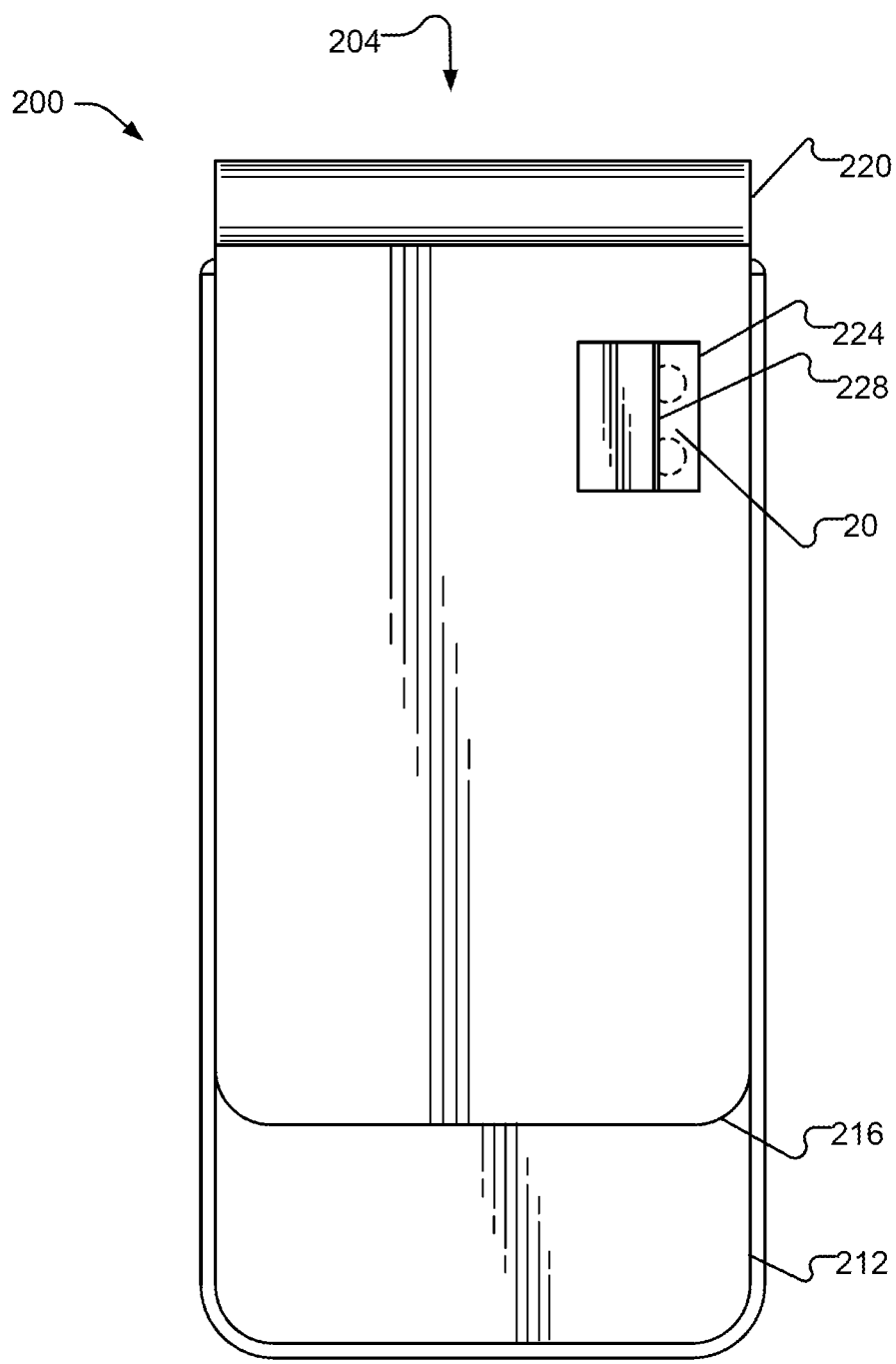
FIG. 6 shows the phone case of FIG. 5 with a cover partially covering the window.
Figure 7:
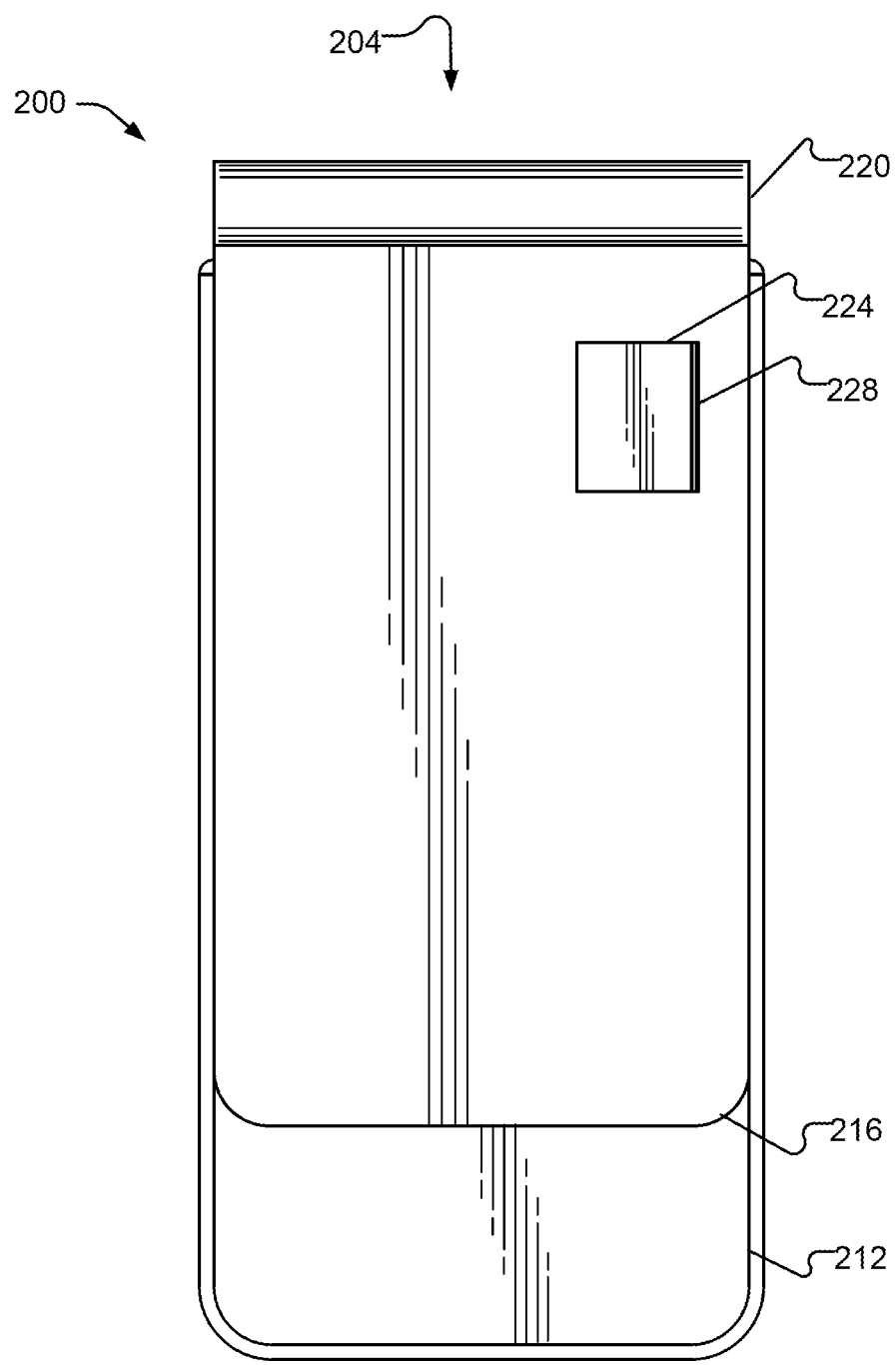
FIG. 7 shows the phone case of FIG. 5 with the cover covering the window.

In another embodiment, as shown in FIGS. 5-7, a rear view of a phone case 200 is shown with a screen shade 216 in the stowed position, i.e., pivoted rearwardly until it is flat against a back side 212 of case 200. One or more openings or windows, such a window 224, are included in screen shade 216 and positioned so that a camera or other component of a phone 20 in case 200 is not blocked by screen shade 216 when in the stowed position. Window 224 is open as shown in FIG. 5, but can be closed with a window cover 228 as shown in FIGS. 6-7. Window cover 228 may be toggled between an open and closed position by any suitable mechanism and preferably by sliding within screen shade 216 (which may operate in either a vertical or horizontal direction) in order to maintain a substantially thin overall profile. As noted, window cover 228 is preferably in the closed position when screen shade 216 is in a shading configuration to improve the shading function of screen shade 216. Window 224 is located such that it will be aligned with the camera location on back side 212 when screen shade 216 is positioned over back side 212.

Figure 8A:
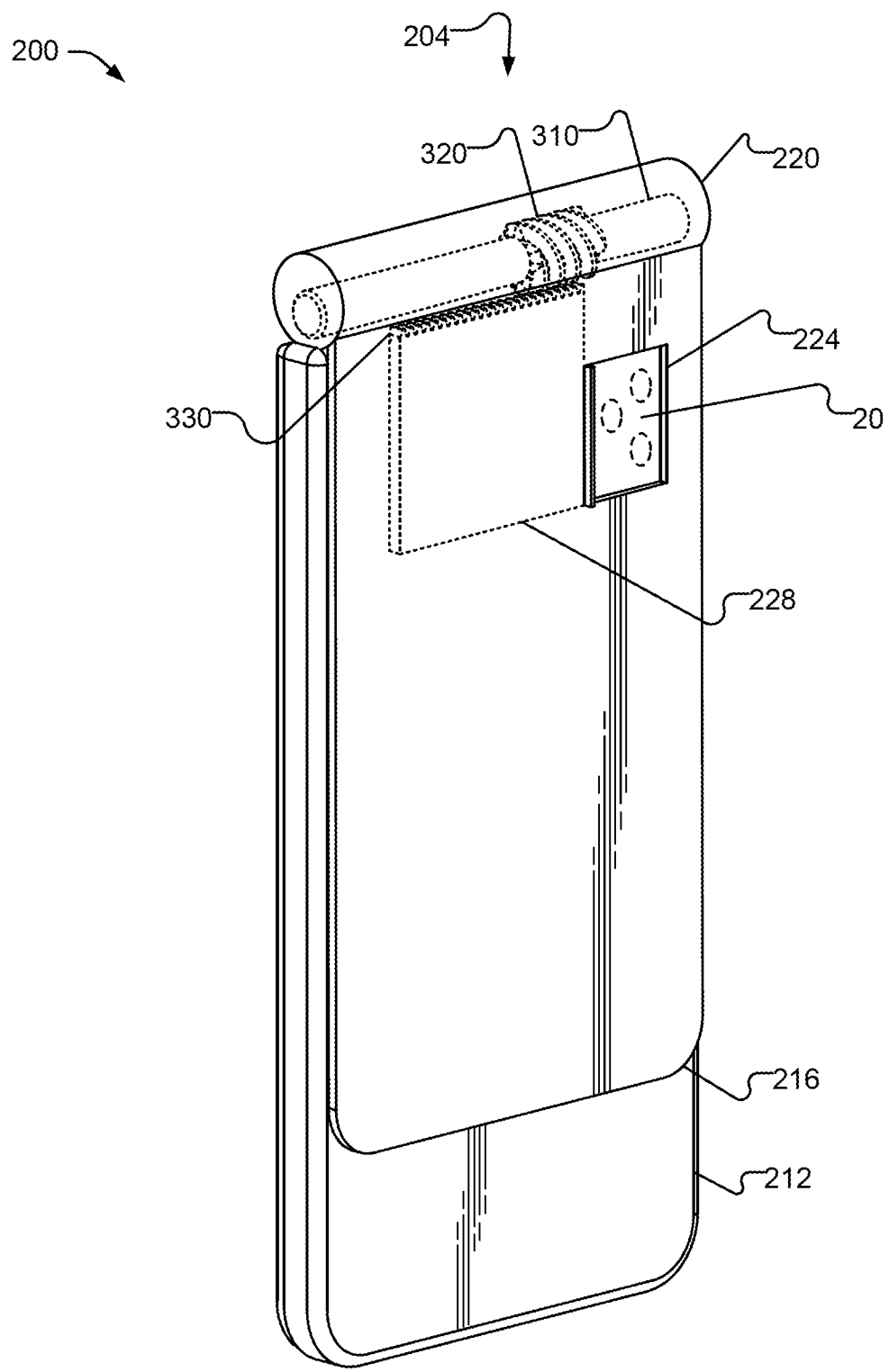
FIGS. 8A-8B illustrate a window cover closing mechanism in accordance with another embodiment of the present invention.
Figure 8B:
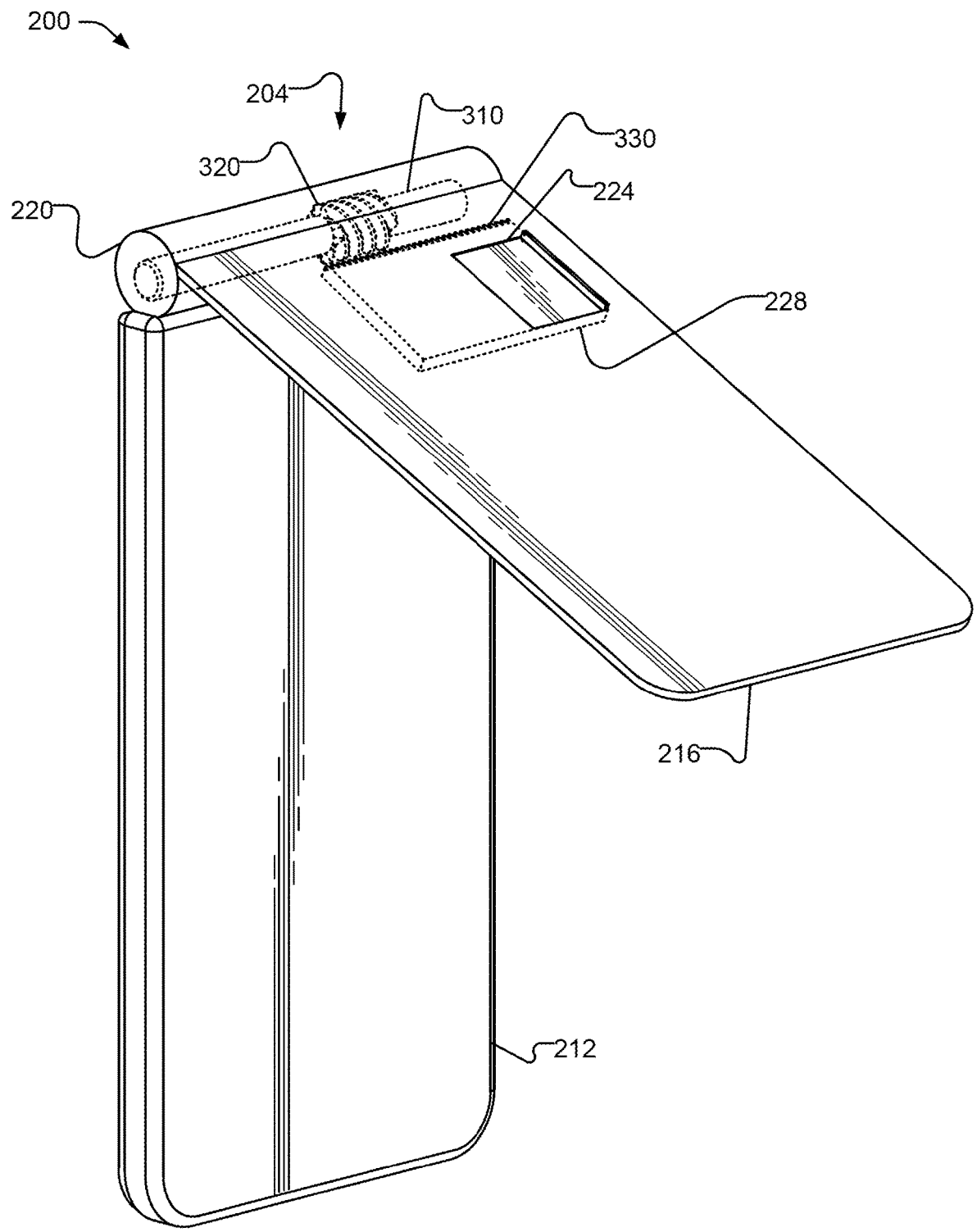

In a preferred embodiment, shown in FIGS. 8A=8B, window cover 228 is connected to screen shade 216 such that window cover 228 transitions from an open state to a closed state as screen shade 216 is moved into shading position and transitions from the closed state to the open state when screen shade 216 is moved into the stowed position. This may occur via any suitable mechanism, such as a worm 320 mounted on a fixed axis 310 positioned in hinge 220 such that a worm rack 330, positioned in screen shade 216, rotates relative to window cover 228 as screen shade 216 is moved between non-shading and shading positions. Window cover 228 is connected to rack 330 so that window cover 228 slides back and forth when screen shade 216 is rotated front and back. In this way, window cover 228 will be closed when screen shade 216 is deployed (FIG. 8B) and be moved into open position when screen shade 216 is against rear 212 of case 200 (FIG. 8A).

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A case for shading a display screen of a phone contained within the case comprising:
   a hinge attached to an edge of the case; and
   a shade panel connected to the hinge an having an opening and a cover for the opening, wherein the cover is slidable between an open position in which the opening is uncovered and a closed position in which the opening is covered, wherein the shade panel is rotatable between a stowed position in which the shade panel is facing and in contact with a rear of the phone and a shading position in which the shade panel is positioned at an angle over the display screen.

2. The system of claim 1, wherein the opening is positioned to be aligned with a camera of the phone when the shade panel is in the stowed position.

3. The system of claim 2, wherein the shade panel has a length that is greater than one half of a length of the display screen.

4. The system of claim 2, wherein the shade panel has a length that is equal to a length of the display screen.

5. The system of claim 2, wherein the hinge is a plano hinge.

6. The system of claim 2, wherein the cover is in the closed position when the shade panel is in the shading position and the cover is in the open position when the shade panel is in the stowed position.

7. The system of claim 2, wherein the shade panel rotates at least 315 degrees.

8. A method for shading a display screen of a phone comprising:
   securing the phone within a case, the case including an edge and a shade panel attached to the edge via a hinge;
   rotating the shade panel from a stowed configuration in which the shade panel lies flat against a rear side of the case to a shading configuration in which the shade panel is angled over a portion of the display screen; and
   sliding a cover of a window in the shade panel from an open position in which the window is uncovered to a closed position in which the window is covered when the shade panel is rotated from the stowed configuration to the shading configuration.

9. A case for a smart phone comprising:
   a front side, wherein the front side is configured to receive and secure the smart phone;
   a rear side opposite the front side;
   an edge between the front side and the rear side; and
   a screen shade having a first surface and being attached to the edge via a hinge, wherein the screen shade includes an opening and a cover for the opening, wherein the cover is slidable between an open position in which the opening is uncovered and a closed position in which the opening is covered,
   wherein the screen shade rotates between a stowed configuration in which the first surface of screen shade is facing and in contact with the rear side of the case and a shading configuration in which the screen shade is positioned at an angle over the front side of the case.

10. The case of claim 9, wherein the opening is positioned to be aligned with a camera of the smart phone when the smart phone is in the case and the screen shade is in the stowed configuration.

11. The case of claim 10, wherein the screen shade has a length that is greater than one half of a length of the front side of the case.

12. The case of claim 10, wherein the hinge is a plano hinge.

13. The case of claim 10, wherein the screen shade rotates around the hinge at least 315 degrees.

14. The case of claim 10, wherein the cover is in the closed position when the screen shade is in the shading configuration and the cover is in the open position when the screen shade is in the stowed configuration.

15. The case of claim 14, wherein a worm is operably connected to the plano hinge and rotates such that a worm rack, positioned in the screen shade and engaged with the worm and the window cover, moves the window cover between the closed position and the open position as the screen shade rotates between the shading configuration and the stowed configuration.

* * * * *